（12） United States Patent
Doree et al.

(10) Patent No.: US 11,785,573 B2
(45) Date of Patent: Oct. 10, 2023

(54) METHOD FOR DETERMINING A GEOGRAPHICAL LOCATION OF AN ACCESS POINT IN A WIRELESS LOCAL ACCESS NETWORK

(71) Applicant: Orange, Paris (FR)

(72) Inventors: José Doree, Châtillon (FR); Jean-Claude Le Rouzic, Châtillon (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 17/255,377

(22) PCT Filed: Jun. 28, 2019

(86) PCT No.: PCT/FR2019/051603
§ 371 (c)(1),
(2) Date: Dec. 22, 2020

(87) PCT Pub. No.: WO2020/002852
PCT Pub. Date: Jan. 2, 2020

(65) Prior Publication Data
US 2021/0266862 A1     Aug. 26, 2021

(30) Foreign Application Priority Data

Jun. 29, 2018   (FR) ...................................... 1856021

(51) Int. Cl.
*H04W 64/00*   (2009.01)
*G01S 5/00*   (2006.01)
*H04W 84/12*   (2009.01)

(52) U.S. Cl.
CPC ......... *H04W 64/003* (2013.01); *G01S 5/0027* (2013.01); *H04W 84/12* (2013.01)

(58) Field of Classification Search
CPC ...... H04W 64/03; H04W 84/12; G01S 5/0027
See application file for complete search history.

(56) References Cited

U.S. PATENT DOCUMENTS

| 10,111,082 B1* | 10/2018 | Hardie .................... H04W 8/02 |
| 2010/0222077 A1* | 9/2010 | Nardini ................. H04W 64/00 |
| | | 455/456.2 |

(Continued)

OTHER PUBLICATIONS

International Search Report and Written Opinion dated Sep. 13, 2019 for Application No. PCT/FR2019/051603.

(Continued)

*Primary Examiner* — Barry W Taylor
(74) *Attorney, Agent, or Firm* — Knobbe, Martens, Olson & Bear, LLP (57) ABSTRACT

A method of determining a geographical location of an access point in a wireless local access network allowing access to a multimedia IP network core, implemented by an input server of the network core, is described. After receipt of a message from a terminal via the access point containing information on the location of the terminal inserted into the message signal, a material identifier of the access point is extracted and stored with the location information. A geographical location of the access point is determined using location information stored with the material identifier of the access point. The geographical location of the access point associated with the extracted material identifier may be inserted into the message signal as the geographical location of the terminal, prior to transmitting this message to another piece of equipment in the network core.

20 Claims, 2 Drawing Sheets

(56) References Cited

U.S. PATENT DOCUMENTS

| | | | |
|---|---|---|---|
| 2011/0249666 A1* | 10/2011 | Holbrook | H04L 65/1006 370/352 |
| 2012/0262335 A1* | 10/2012 | Holcman | H04W 24/10 342/357.42 |
| 2013/0065606 A1* | 3/2013 | Kurokawa | H04L 65/1016 455/456.1 |
| 2013/0084809 A1* | 4/2013 | Johansson | H04W 76/19 455/67.11 |
| 2017/0093882 A1* | 3/2017 | Khuu | G01S 5/0072 |
| 2017/0195849 A1 | 7/2017 | Österlund | |
| 2017/0238146 A1* | 8/2017 | Kulig | H04W 4/029 455/456.1 |
| 2018/0041879 A1* | 2/2018 | Hooker | H04W 4/029 |
| 2019/0356742 A1* | 11/2019 | Ali | H04L 67/143 |

OTHER PUBLICATIONS

French Search Report dated Apr. 3, 2019 for Application No. 1856021.

\* cited by examiner

METHOD FOR DETERMINING A GEOGRAPHICAL LOCATION OF AN ACCESS POINT IN A WIRELESS LOCAL ACCESS NETWORK

RELATED APPLICATIONS

This application is the U.S. National Phase of Application No. PCT/FR2019/051603 entitled "METHOD FOR DETERMINING A GEOGRAPHICAL LOCATION OF AN ACCESS POINT IN A WIRELESS LOCAL ACCESS NETWORK" and filed Jun. 28, 2019, which claims the benefit of French Patent Application No. 1856021, filed Jun. 29, 2018, each of which is incorporated by reference in its entirety.

BACKGROUND OF THE INVENTION

The invention relates to the general field of telecommunications.

It more particularly concerns the location of users registered on an IP multimedia core network.

The location of a user or more particularly of a terminal of a user registered on an IP multimedia core network is important, both from the regulatory point of view, to be in a position, for example, to manage emergency calls transmitted by the terminal, and from the point of view of the many services that can be offered by the core network operator and which rely on such a location (e.g. personalized services as a function of the location of the user.)

The access to an IP multimedia core network can be done, in a known manner, via various types of access technology. To stream the communications of their users, current telecommunications networks increasingly rely on types of access technology using local access networks such as for example WiFi (Wireless Fidelity) technology. These types of access technology make it possible to stream both phone calls (for example via VoWiFi for Voice over WiFi technology) and to exchange instant messages (of SMS for Short Message Service or MMS for Multimedia Message Service type).

Unlike access technology relying on a cell network (e.g. circuit-switched network, 3G, 4G or 5G), for access technology relying on local access networks and in particular for WiFi technology, there is no predetermined mapping that allows the IP multimedia core network to be associated with an area served via this technology for accessing a particular geographical location. The IP multimedia core network has at the most access to an identifier of the local access network (for example an identifier of SSID for Service Set Identification type) used by the terminal of the user to connect to the core network and to a hardware identifier (for example a MAC (Medium Access Control) address of the access point of this local access network to which the terminal is connected. These data items do not however supply any item of location information, strictly speaking, to the IP multimedia core network to locate the terminal of the user. Specifically, the access point (and the local access network relying on this access point) can be caused to move, for example if the installation is relocated by the user to another place during a house move.

Subject and summary of the invention The invention in particular makes it possible to remedy the aforementioned drawbacks of the prior art by proposing a method for determining a geographical location of an access point of a wireless local access network used to access an IP multimedia core network, this method being intended to be implemented by a server situated at the entrance of the IP multimedia core network and comprising:

following the receipt of at least one message coming from at least one terminal via said access point containing an item of location information of the terminal inserted by this terminal into the signaling of the message:
   a step of extracting said signaling from a hardware identifier of said access point; and
   a step of storing in association with the hardware identifier of said access point said item of location information inserted into the message by the terminal;

and
   a step of determining a geographical location of the access point on the basis of at least one said item of location information stored in association with the hardware identifier of the access point.

Correspondingly, the invention concerns a server situated at the entrance of an IP multimedia core network comprising modules, enabled for at least one access point of at least one local access network used to access the IP multimedia core network, these modules comprising:

extraction and storage modules, enabled following the receipt of at least one message via said access point, coming from at least one terminal connected to the access point, the signaling of which contains an item of location information of the terminal inserted by this terminal, said extraction module being configured to extract from said signaling a hardware identifier of the access point and said storage module being configured to store in association with the hardware identifier of the access point extracted by the extraction module, the item of location information inserted by the terminal into the message; and a determination module configured to determine a geographical location of the access point on the basis of at least one item of location information stored by its storage module in association with the hardware identifier of the access point.

In other words, the invention proposes to correlate, at the level of a server situated at the entrance of the IP multimedia core network via which messages intended to be processed by the core network (in other word at the level of a proxy server) transit, items of location information inserted by certain terminals into their messages with a hardware identifier of the access points through which these terminals pass. The terminals in question can in particular be terminals equipped with a GPS (Global Positioning System) module and the location function of which is enabled. They are configured in a known manner to insert, into a field of their message signaling provided for this purpose, their current geographical position in the form of a set of GPS coordinates. However the invention is not limited to the insertion of GPS coordinates into the signaling by the terminals as an item of location information. The signaling can also comprise other types of items of location information inserted by the terminal such as for example a civic address, etc.

In accordance with the invention, when the server situated at the entrance of the IP multimedia core network detects the presence of such a geographical position inserted by the terminal into a message that it receives via an access point of a local access network (or in general an item of location information inserted by the terminal), it extracts this geographical position and associates it with the hardware identifier of the access point itself contained in the signaling of the message. When the server possesses several geographical positions associated with one and the same access point hardware identifier, extracted from different messages (whether or not they come from different terminals), it determines a geographical location of the access point on the basis of this plurality of positions.

It should be noted that no limitation is attached to the nature of the messages considered by the server for extracting the items of location information of the terminals. It can for example be a message of registration of a terminal on the IP multimedia core network or a message of initiation of a communication by the terminal via the IP multimedia core network etc.

The invention therefore relies on the fact that on the one hand, even though the access points can be caused to be moved intermittently by their users, these are items of equipment, which by virtue of their function and use, are intended to be more or less stationary and which, moreover, serve terminals generally situated in their vicinity (these terminals share approximately the same location.) By using the geographical positions escalated by the terminals passing through an access point to access the IP multimedia core network, it is therefore possible to obtain a relatively accurate estimate of the geographical location of this access point.

Reciprocally, based on the same assumptions, owing to the invention it is also possible to obtain the location of terminals that are attached to a given access point and which do not have the ability to escalate their geographical position, for example because their location function is disabled. The invention therefore allows the IP multimedia core network to easily possess the geographical location of all the terminals registered on it, whether they are connected to the IP multimedia core network by cellular access technology or by a type of access technology relying on a local network (for example wireless such as WiFi). In this way, it is possible for the operator of the IP multimedia core network to offer personalized services and/or services relying on the location of the users.

The fact of considering (optionally) a plurality of geographical positions to estimate the geographical location of the access point makes it possible to improve the estimate made. Furthermore, it makes it possible to detect and to take into account any movement of the access point. Thus, in a particular embodiment, the geographical location of the access point is determined by means of a number of items of location information, stored in association with the hardware identifier of the access point, above a determined threshold.

This threshold can be determined experimentally. It can furthermore take into account the dispersion of the items of location information escalated by the terminals (for example with a view to detecting, as previously mentioned, any movement of the access point). The geographical locations escalated by the terminals can in particular be associated with an item of time-based information expressing their current condition (in other words, the time at which they were acquired or escalated).

Moreover, different ways of computing the geographical location of the access point on the basis of the geographical locations escalated by the terminals attached to this access point can be envisioned.

Thus, in a particular embodiment, during the determination step, if there are a plurality of items of location information, the geographical location of the access point is determined by computing a barycenter of said plurality of items of location information.

In a variant, the geographical location of the access point can be determined on the basis of the item of location information, stored in association with the hardware identifier of the access point, the most recent or the most frequent (with a small amount of deviation).

In another embodiment, the geographical location of the access point is moreover determined using an item of location information of a cell of a cellular access network to which a terminal is attached during a re-registration of the terminal on the IP multimedia core network, this re-registration following a previous registration of the terminal on the IP core network using the local access network and said access point.

This embodiment has a preferred application in the context of telecommunications networks using the SIP (Session Initiation Protocol) protocol, such as for example networks based on an IMS (IP Multimedia Subsystem) architecture, and which require the terminals in particular to re-register with the core network when they change access technology type (for example when they switch from WiFi access to cellular access). As mentioned previously, for cellular access technologies there exists a mapping accessible by the IP multimedia core network associating with the identifiers of the cells of the networks their geographical positions. Using the cell of the cellular network via which the terminal registers again with the core network, after having switched to this cellular network from a local access network, it is possible to increase the reliability of the knowledge of the geographical position of the access point of the local access network to which the terminal had previously been attached, assuming that this cell is currently in the vicinity of the access point in question.

In another embodiment, the geographical location of the access point is moreover determined using an item of location information of a cell of a cellular access network to which a terminal had previously been attached before registering or re-registering with the IP multimedia core network using the local access network and said access point.

As mentioned previously, the server according to the invention is situated at the entrance of the IP multimedia core network, particularly so that this server can have a view of the access networks used by the terminals. In an architecture of IMS type, this server is preferably a P-CSCF (Proxy-Call Session Control Function) server of the IP multimedia core network.

Furthermore, the fact of attributing the function of location of the access point to a server situated at the entrance of the IP multimedia core network offers the possibility of making use of this item of information within the same IP multimedia core network.

According to another aspect, the invention also concerns a method for managing at least one database of an IP multimedia core network by a server situated at the entrance of the IP multimedia core network, this management method comprising, for at least one access point of at least one local access network used to access the IP multimedia core network:
- a step of determining a geographical location of the access point using a determination method according to the invention; and
- a step of storing in a first database of the IP multimedia core network said geographical location of the access point in association with a hardware identifier of the access point.

Correspondingly, the invention also concerns an IP multimedia core network comprising a first database and a server according to the invention configured to store in this first database for said at least one access point, the hardware identifier of said at least one access point in association with the geographical location of the access point determined by the determination module of the server.

Thus, the items of location information of the access points obtained by the server according to the invention are advantageously used to supply a (first) database of the IP multimedia core network, accessible by the other items of equipment of the IP multimedia core network. It is also possible to envision to make this first database accessible to third-party applications for the provision of services relying on the location of the users of the IP multimedia core network.

In a particular embodiment, the management method further comprises, on receiving at least one message coming from a terminal via an access point of a local access network or via a cell of a cellular network to which the terminal is attached:
- a step of extracting from the signaling of the message a hardware identifier of the access point or an identifier of the cell, and at least one item of information from among:
  - a communication identifier allocated to a user of the terminal, such as for example an MSISDN (Mobile Station ISDN Number) identifier, also currently designated by telephone number, allocated to the user;
  - a communication identifier of the terminal used on the IP multimedia core network, such as for example a IMSI (International Mobile Subscriber Identity) identifier stored in the SIM (Subscriber Identity Module) or USIM (Universal SIM) card of the terminal; and
  - an address where the terminal can be reached, such as for example an IP (Internet Protocol) or URI (Universal Resource Identifier) address; and
- a step of storing in a second database of the IP multimedia core network said at least one item of information in association with the hardware identifier of the access point or with the identifier of the cell.

Correspondingly, the IP multimedia core network further comprises, in this embodiment, a second database, and the extraction module of the server is configured to extract from the signaling of at least one received message coming from a terminal via an access point of a local access network or a cell of a cellular network to which the terminal is attached, a hardware identifier of the access point or an identifier of the cell as well as at least one item of information from among:
- a communication identifier allocated to a user of the terminal;
- a communication identifier used by the terminal on the IP multimedia core network; and
- an address where the terminal can be reached;

the storage module of the server being configured to store in said second database at least one item of information in association with the hardware identifier of the access point or the identifier of the cell.

In this embodiment, the server according to the invention makes use of the items of information present in the signaling of the messages that transit over it to supply a second database of the IP multimedia core network. These items of information can then be easily made use of by items of equipment of the core network or third-party applications as mentioned previously for the first database. It should be noted that the first database and the second database can be contained in a single database.

In a particular embodiment, the management method further comprises, when the terminal is attached to a cell of a cellular network, a step of storing in a third database of the IP multimedia core network a geographical location of the cell in association with the identifier of the cell.

Correspondingly, the IP multimedia core network further comprises, in this embodiment, a third database containing, for at least one cell of a cellular access network used to access the IP multimedia core network, an identifier of this cell in association with a geographical location of this cell.

Similarly, the third database can be separate from or merged with the first database and/or second database.

As mentioned above, the items of location information and other items of information collected by the server and used to supply the first, second and/or third databases can be easily made use of by items of equipment of the multimedia core network or by third-party applications.

Thus, in an embodiment, the managing method further comprises, following the receipt by the server of a message coming from a terminal via an access point of a local access network used to access the IP multimedia core network:
- a step of extracting from this message a hardware identifier of the access point;
- a step of determining, by polling the first database, a geographical location of the access point associated with the hardware identifier extracted from the message; and
- a step of inserting into the signaling of the message, as geographical location of the terminal, the geographical location of the access point determined during the determination step, before transmitting this message to another item of equipment of the IP multimedia core network.

By providing the geographical location of the terminal in the message relayed to the other items of equipment of the IP multimedia core network, the server according to the invention allows these items of equipment to make use of this item of location information, including for terminals that do not have the ability or which are not configured to provide it.

The invention also concerns a system comprising:
- an IP multimedia core network according to the invention comprising a first, a second and a third database as previously described; and
- a software application able to provide a service, said software application being configured, during the provision of said service, to:
  - identify the location of a user of a terminal on the basis of a communication identifier allocated to said user; and/or
  - identify communication identifiers allocated to users located in a determined geographical area; and/or
  - identify the location of an access point of a local access network used to access the IP multimedia core network on the basis of a hardware identifier of this access point; and/or
  - identify an access point of a local access network located in the vicinity of a determined geographical area;

by polling said first and/or said second and/or said third database of the IP multimedia core network.

The system according to the invention enjoys the same previously-mentioned advantages as the management method and the IP multimedia core network.

In a particular embodiment, the different steps of the determination method and/or the management method are determined by computer program instructions.

As a consequence, the invention also concerns a computer program on an information medium, this program being able to be implemented in a server or more generally in a computer, this program including instructions suitable for implementing the steps of a determination method and/or management method as described above.

This program can use any programming language, and be in the form of source code, object code, or intermediate code between source code and object code, such as in a partially compiled form, or in any other desirable form.

The invention also concerns an information or recording medium readable by a computer and including instructions of a computer program as mentioned above.

The information or recording medium can be any entity or device capable of storing the program. For example, the support can include a storage means, such as a ROM, for example a CD-ROM or a microelectronic circuit ROM, or else a magnetic recording means, for example a hard disk.

Moreover, the information or recording medium can be a transmissible medium such as an electrical or optical signal, that can be routed via an electrical or optical cable, by radio or by other means. The program according to the invention can in particular be downloaded over a network of Internet type.

Alternatively, the information or recording medium can be an integrated circuit into which the program is incorporated, the circuit being suitable for executing or for being used in the execution of the method in question.

It is also possible to envision, in other embodiments, that the determination method, the server, the management method, the IP multimedia core network and the system according to the invention have in combination all or part of the aforementioned features.

BRIEF DESCRIPTION OF THE DRAWINGS

Other features and advantages of this invention will become apparent from the description given below, with reference to the appended drawings which illustrate an exemplary embodiment thereof devoid of any limitation. In the figures.

The appendix 1 is a reproduction of part of the signaling of a SIP REGISTER message containing items of information used by the invention.

DETAILED DESCRIPTION OF THE INVENTION

Figure 1:
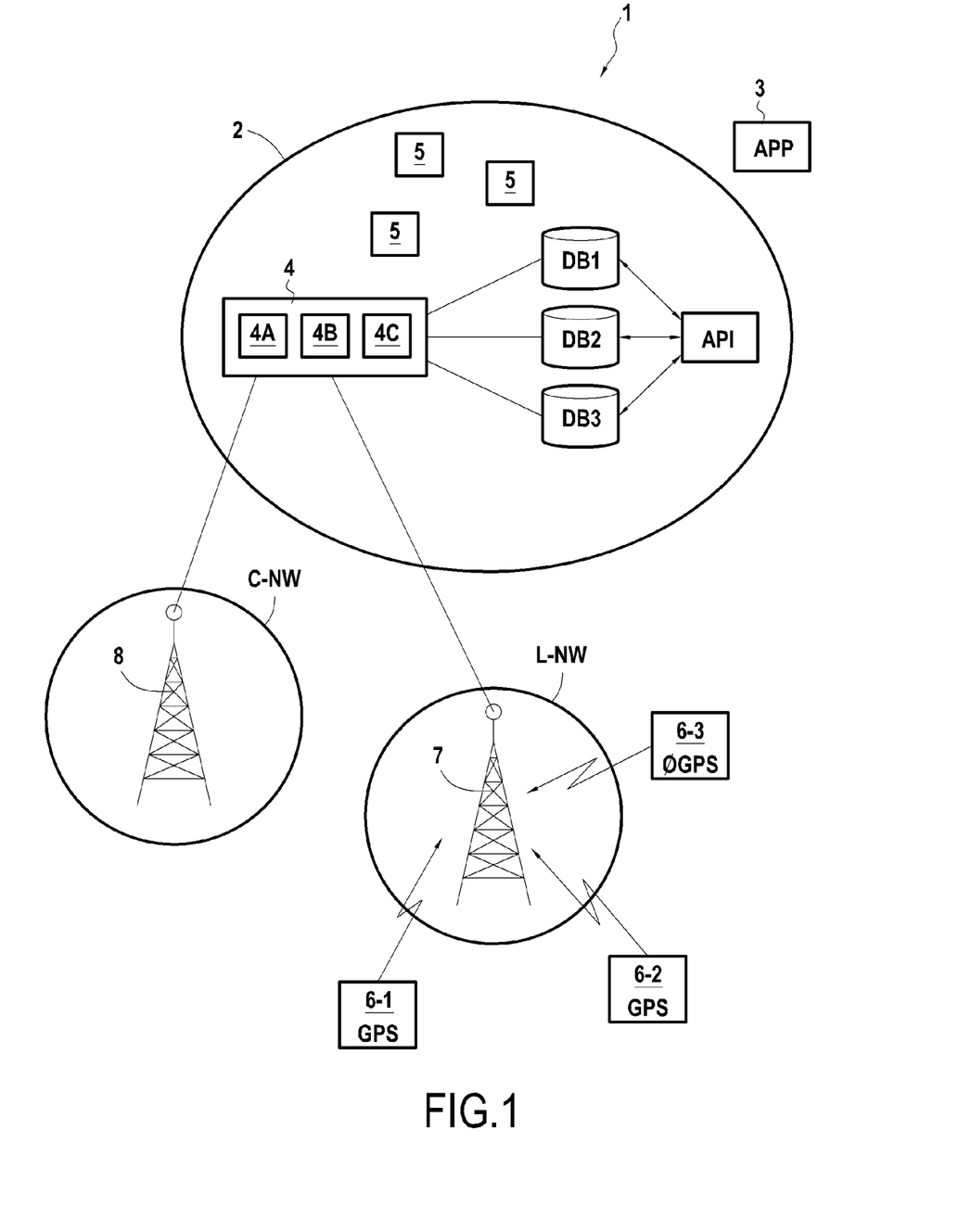
FIG. 1 schematically represents a system and a server in accordance with the invention, in a particular embodiment.

FIG. 1 represents, in its environment, a system 1 in accordance with the invention.

In the example envisioned in FIG. 1, the system 1 comprises an IP multimedia core network 2, in accordance with the invention, and a software application 3, able to provide one or more services to users, this service or services being personalized here according to the location of the users. By way of illustration, the software application 3 can for example provide a weather warning service to its users and in particular inform the users situated in a given geographical area if severe or dangerous weather phenomena (e.g. hurricanes, storms, floods etc.) are to occur in this geographical area. This is of course only an illustrative example and other types of application may be considered (fire warning, missing child alert, terrorist attack prevention, advertising campaign etc.). It should be noted that the software application 3 can be provided by the operator of the core network 2 (it can be hosted by an item of equipment of the core network 2) or by any other service provider.

In accordance with the invention, the core network 2 comprises different items of equipment, and in particular a server 4 in accordance with the invention, situated at the entrance of the core network 2 (from the point of view of the users of the IP multimedia core network 2, and more particularly of the terminals of the users: the server 4 is the point of entrance into the core network 2 of the messages sent by the terminals registered on the core network 2 intended for the latter). It acts as a proxy server and transmits to the other items of equipment of the core network 2 (generally referenced as 5) the messages that it receives from the terminals registered on the core network 2 for processing.

In the embodiment described here, the core network 2 is based on an IMS architecture and uses the SIP protocol: here, the server 4 according to the invention is (or is hosted by) a P-CSCF proxy server to which are connected different access points and base stations of various access networks allowing a plurality of terminals to access the IP multimedia core network 2. These terminals are denoted in FIG. 1 and in the remainder of the description in general by the reference 6, or more specifically by the references 6-1, 6-2, etc. when one particular terminal is concerned. No limitation is attached to the nature of these terminals: this can be so-called smartphones, laptop computers, digital tablets etc. In the embodiment described here, it is supposed that the terminals 6 are terminals implementing the SIP protocol.

In the example considered in FIG. 1, it is supposed that the terminals 6 can access the IP multimedia core network 2 via an access point 7 of a wireless local access network L-NW (using WiFi technology) or via a base station 8 of a cellular access network C-NW such as for example a 2G, 3G or 4G network. It should however be noted that no limitation is attached to the types of access technology respectively used by the local access network L-NW and by the cellular access network C-NW under consideration, and other types of technology than WiFi and 2G/3G/4G technology, and also a different number of access networks, can be envisioned to access the IP multimedia core network 2. The invention in particular applies to any local network able to use a non-3GPP access technology and in particular a non-secure non-3GPP access technology such as for example WiMax technology.

The items of equipment 5 of the core network 2 are for example a S-CSCF (Serving CSCF) server, application servers, other SIP proxy servers, a PCRF (Policy and Charging Rules Function) server etc. No limitation is attached to the nature of these items of equipment which are well-known in an IMS architecture.

Figure 2:
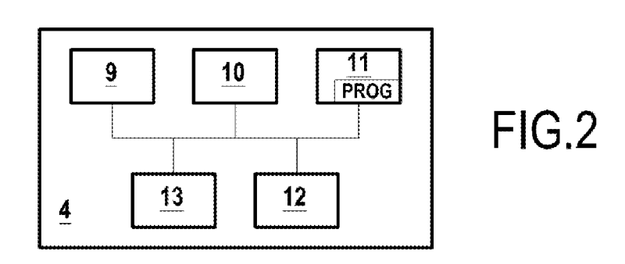
FIG. 2 illustrates an example of hardware architecture of the server represented in FIG. 1, in a particular embodiment.

In the embodiment described here the server 4 has the hardware architecture of a computer, as schematically illustrated in FIG. 2.

It particularly comprises a processor 9, a random-access memory 10, a read-only memory 11, a non-volatile flash memory 12, as well as communicating means 13 allowing it to communicate with the other items of equipment of the core network 2, but also with the different access points and base stations of the access networks used to access the IP multimedia core network 2 (namely in the example envisioned here with the access point 7 and with the base station 8).

These communicating means 13 also implement here a communication interface allowing the server 4 to supply and poll various databases of the core network 2, and in particular in the embodiment described here, a first database DB1, a second database DB2 and a third database DB3. This communication interface for example uses the Diameter application protocol, known per se and currently used in telecommunications network cores. In the embodiment described here, the database DB3 contains a map of the cellular networks able to be used by the terminals 6 to access the core network 2: for each of these cellular networks (and therefore in particular for the cellular network C-NW illustrated in FIG. 1), the database DB3 lists all the cells of the cellular network (each identified by means of a unique identifier) and their geographical locations: thus, each cell identifier is associated in the database DB3 with a geographical position corresponding for example to the center of the cell or to the position of the base station covering this cell. Such a database is known per se and is not described in further detail here. The contents of the databases DB1 and DB2 are, however, described in more detail below.

The read-only memory 11 of the server 4 constitutes a recording medium in accordance with the invention, readable by the processor 9 and wherein is recorded a computer program PROG in accordance with the invention: the program PROG here includes instructions for executing the steps of the determination method according to the invention and for executing the steps of the management method according to the invention. In a variant, separate programs may be envisioned for the two methods.

More specifically, the computer program PROG here defines functional and thus software modules of the server 4 which use or rely on the hardware elements 9-13 of the server 4 mentioned previously. These modules in particular comprise, as illustrated in FIG. 1:

extraction 4A and memorization 4B modules, enabled following the receipt of a message by the server 4 via an access point of a local access network (such as for example the access point 7 of the local network L-NW), coming from a terminal connected to this access point and the signaling of which contains an item of location information of the terminal inserted thereby. The extraction module 4A is configured to extract from the signaling of the message a hardware identifier of the access point through which the terminal passed and the item of location information inserted by the terminal. The storage module 4B is configured to store the data extracted by the extraction module 4A, and more specifically the hardware identifier of the access point in association with the inserted item of location information. This data can be stored in a memory of the server 4, such as for example in its non-volatile memory 12, or in a database of the core network 2, such as for example in the first database DB1. In the embodiment described here, the extraction module 4A and the storage module 4B are further configured to, respectively, extract from the signaling of each received message coming from a terminal via an access point of a local access network (such as for example via the access point 7 of the local network L-NW) or a cell of a cellular network (such as for example the cell covered by the base station 8 of the cellular network C-NW) to which the terminal is attached, a hardware identifier of the access point or an identifier of the cell as well as at least one item of information from among:

a communication identifier allocated to a user of the terminal, such as for example a MSISDN number;

a communication identifier used by the terminal on the IP multimedia core network, such as for example an IMSI identifier;

an address where the terminal can be reached such as for example a URI address or an IP address;

and to store in a database of the core network 2, such as for example in the second database DB2, the items of information extracted in association with the hardware identifier of the access point or with the identifier of the cell; and     a determination module 4C, configured to determine a geographical location of an access point on the basis of at least one item of location information stored by its storage module 4B in association with the hardware identifier of the access point. In the embodiment described here, the server 4 is configured to store in the first database DB1 the geographical location of the access point determined by the determination module 4C in association with the hardware identifier of this access point.

The functions of these modules will now be described in more detail, with reference to the steps of the location method and the management method according to the invention.

Figure 3:
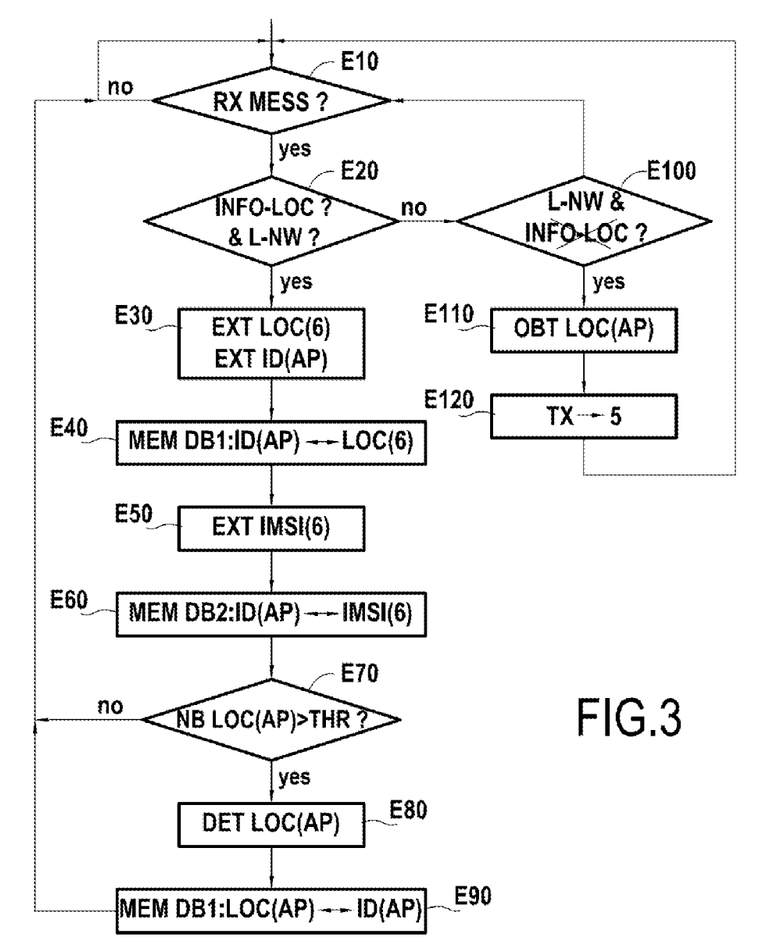
FIG. 3 represents the main steps of a determination method and a management method according to the invention as implemented by the server of FIG. 1 in a particular embodiment.

FIG. 3 represents the main steps of a determination method and a management method according to the invention as implemented by the server 4, in a particular embodiment. It should be noted that in accordance with the invention, the management method includes the steps of the determination method.

To illustrate the different steps of the determination method according to the invention, the terminals of interest here are the terminals 6-1, 6-2 and 6-3 and it is supposed that the terminals 6-1 and 6-2 are equipped with location modules such as GPS modules and that these modules are enabled, such that the terminals 6-1 and 6-2 are capable of communicating to the core network 2 their geographical positions, for example in the form of GPS coordinates. On the other hand it is supposed that the terminal 6-3 does not in the example here possess such a location module, or that, if it does possess a location module, its location function is disabled: the terminal 6-3 thus does not provide any item of information about its geographical location when it communicates, in particular with the core network 2.

The terminals 6-1, 6-2 and 6-3 are also supposed to all be initially connected to the access point 7 of the WiFi local access network L-NW.

It is now supposed that the terminal 6-1 transmits a registration message to the core network 2. We will describe how this message is processed by the server 4. It should be noted that the server 4 applies the same processing to all the messages transmitted by terminals that are attached to it, whether they are registration messages, communication initiation messages, etc.

In the embodiment described here, the registration message transmitted by the terminal 6-1 is a SIP REGISTER message addressed to the core network 2, which is sent via the access point 7 of the local network L-NW and which transits via the server 4 situated at the entrance of the core network 2. An example of the signaling of this SIP REGISTER message is given in Appendix 1. In a known manner, the signaling of the SIP REGISTER message comprises a certain number of fields, not described in detail here, and in particular:

a "username" field containing the element "208014449145219@ims.mnc001.mcc208.3gppnetwork.org" denoting the IMSI identifier allocated to the terminal 6-1 (communication identifier allocated to the terminal within the meaning of the invention);

a "P-Access-Network-Info" field containing the elements "IEEE-802.11; i-wlan-node-id=d84710fed998", this field characterizing the wireless access used by the terminal 6-1 and providing a hardware identifier (id=d84710fed998) of the access point through which the terminal passed, i.e. here of the access point 7. In the example envisioned here, this hardware identifier is a MAC address uniquely identifying the access point 7; and in the encapsulated item of presence information "application/pidf", a "gp: location-info" field containing various items of information related to the location of the terminal 6-1 obtained thereby using its GPS location module (and where applicable the enabled location function at the terminal 6-1 and employing this GPS module). These items of information here particularly comprise the geographical position (location) of the terminal 6-1 expressed in the form of GPS coordinates "<gml:pos>48.7601868 −3.4733915</gml:pos>", as well as the civic address corresponding to this GPS location:

"<cl:civicAddress>
  <cl:country>FR</cl:country>
  <cl:A3>Lannion </cl:A3>
  <cl:A6>Rue Blaise Pascal </cl:A6>
  <cl:PC>22300</cl:PC>
</cl:civicAddress>"

These items of geographical location of the terminal 6-1 are inserted by the terminal itself into the "gp: location-info" field of the signaling of the SIP REGISTER message, when the terminal possesses (enabled) location abilities. They are described in more detail in the document RFC 3863 published by the IETF (August 2004).

On receiving the SIP REGISTER message from the terminal 6-1 (yes answer to the test step E10), the server 4, by way of its extraction module 4A, determines whether or not the SIP REGISTER message received from the terminal 6-1 contains an item of location information of the terminal inserted by the terminal into the message signaling (test step E20). To do this here, it looks at whether or not the signaling of the message contains "gp: location-info" field.

Where applicable (yes answer to the test step E20), the extraction module 4A of the server 4 extracts from the <gml:pos>field contained in the "gp: location-info" field the geographical location of the terminal 6-1 given by its GPS coordinates, here denoted LOC(6-1)=48.7601868 −3.4733915 (step E30).

The server 4 moreover detects, via the intermediary of its extraction module 4A, that the terminal 6-1 has used a local access network of IEEE 802.11 (WiFi access network) type to send its message, and that it was connected for this purpose to the access point 7, the hardware identifier (here the MAC address) of which is given in the "-Access-Network-Info" field of the SIP REGISTER message. The extraction module 4A thus extracts the hardware identifier ID(7)=d84710fed998 of the access point 7 from the signaling of the SIP REGISTER message.

Next the storage module 4B stores. here in the first database DB1, in association with the hardware identifier ID(7) of the access point 7, the geographical location LOC(6-1) here entered in the SIP REGISTER message by the terminal 6-1 (step E40). In the embodiment described here, the updating of the database DB1 is carried out by way of an interface implementing the Diameter protocol, known per se.

In a variant embodiment, the extraction module 4A can further extract from the signaling of the SIP REGISTER message other items of location information of the terminal 6-1 than its GPS coordinates, such as for example the civic address corresponding to these coordinates, these items of information also being able to be stored by the storage module 4B in the database DB1 in association with the hardware identifier ID(7) of the access point 7.

It should be noted that the steps E20 to E40 that have just been described can be implemented indifferently by the server 4 on receiving the SIP REGISTER message or only after having been informed by the S-CSCF server of the IP multimedia core network 2 of the positive authentication of the terminal 6-1.

In the embodiment described here, the server 4, by way of its extraction module 4A, extracts other items of information from the signaling of the SIP REGISTER message received from the terminal 6-1, namely for example the IMSI identifier "208014449145219" of the terminal 6-1 contained in the "username" field (step E50), and stores this IMSI identifier in association with the hardware identifier ID(7) of the access point 7 in the database DB2 (step E60). In the embodiment described here, the updating of the database DB2 is carried out by way of an interface implementing the Diameter protocol, known per se.

In a variant, other items of information can be extracted by the server 4 from the signaling of the SIP REGISTER message and stored in the database DB2 such as for example:

an item of communication information allocated to a user of the terminal, such as its MSISDN number; or an address where the terminal can be reached, such as an IP address or a URI.

Then, in the embodiment described here, the server 4 determines by way of its determination module 4C how many geographical locations are stored in association with the hardware identifier of the access point 7 in the database DB1 (test step E70). Specifically, as mentioned above, the steps E10 to E60 are implemented by the server 4 for all the messages received from all the terminals that are attached to it. In other words, for each message received via an access point of a local access network, the server 4 looks at whether or not the message contains an item of location information inserted by the terminal that originated the message and where applicable stores it in association with the hardware identifier of the access point in the database DB1. At a given instant, there can therefore be several geographical locations of terminals (separate or otherwise) associated with one and the same hardware identifier of an access point. If the number of geographical locations registered in association with the hardware identifier of the access point 7 (denoted NB-LOC(AP) with AP=7 in the example under consideration here) is below a predetermined threshold THR ("no" answer to the test step E70), the server 4 processes the SIP REGISTER message of the terminal 6-1 as it usually does, and goes back to waiting for a new message from a terminal. Otherwise ("yes" answer to the test step E70), the server 4 considers that there are enough items of information stored in the database DB1 to reliably determine the geographical location of the access point 7: more precisely, the determination module 4C of the server 4 then determines the geographical location of the access point 7 (step E80) on the basis of all of the geographical locations of the terminals associated in the database DB1. The threshold THR can be determined experimentally or be configurable.

For this purpose, in the embodiment described here, the determination module 4C determines the location LOC(AP)

(with AP=7 here) of the access point 7 by computing the barycenter of the items of location information stored in association with the hardware identifier of the access point 7. As a reminder, these items of location information are here GPS coordinates.

In a variant, other ways of determining the geographical location of the access point 7 on the basis of the geographical locations of the terminals stored in the database DB1 in association with the hardware identifier of the access point 7 can be envisioned. Thus, for example, the geographical location of the access point can be determined on the basis of the geographical location (stored in the database DB1 in association with the hardware identifier of the access point 7) the most recent or the most frequent (where applicable taking into account a low maximum deviation between the geographical locations of the terminals under consideration to determine the most frequent location).

Following the determination of the geographical location of the access point 7, the storage module 4C stores this location LOC(7) in association with the hardware identifier of the access point 7 in the database DB1 (step E90). Then the server 4 usually processes the SIP REGISTER message emitted by the terminal 6-1, and conventionally transmits it to the other items of equipment of the core network 2 for processing.

In the embodiment described here, the determination module 4C determines the location LOC(7) of the access point 7 by computing the barycenter of all the items of location information stored in association with the hardware identifier of the access point 7 in the database DB1. In a variant, it is possible to envision that the determination module 4C only takes into account items of location information stored within a predetermined time interval, so as not to take into account items of information which are too old and which may no longer be relevant (the items of location information can for this purpose be time-stamped upon their registration in the database DB1; the same applies for the geographical location determined for each access point). In yet another variant, the determination module 4C can evaluate beforehand if certain geographical locations are deviant on the basis of predetermined criteria, and not take them into account when determining the geographical location of the access point 7.

As mentioned previously, the steps E10 to E90 are reiterated for each message received by the server 4 from terminals connected to various local access networks used to access the IP multimedia core network 2, and containing in their signaling an item of location information inserted by the terminals. When the terminals use cellular access networks to send their messages intended for the core network 2, the server 4 can proceed in a similar way to what it does for the local networks in the steps E50 and E60 and extract from the signaling of the received messages an identifier of the cell to which the terminal is attached as well as other items of information such as a communication identifier (e.g. MSISDN) allocated to the user of the terminal, or a communication identifier of the terminal used on the core network (e.g. IMSI) or else an address (IP or URI address) where the terminal can be reached, and store these items of information in association with an identifier of the cell in the second database (step not represented in FIG. 3).

If the received message is a message of re-registration of the terminal on the core network 2, if this re-registration is required via a cellular access network and follows a previous registration of the terminal at the core network via a local access network and a given access point, the server 4 can furthermore store in the database DB1, in association with the hardware identifier of the access point in question, the geographical location of the cell to which the terminal is attached at the time of its re-registration, and take into account this geographical location to determine the geographical location of the access point in question (or to update this geographical location). It should be noted that the geographical location of the cell can be obtained by the server 4 by polling the database DB3 on the basis of the cell identifier included in the re-registration message received from the terminal.

In another embodiment, the server 4 can determine the geographical location of an access point, furthermore using an item of location information of a cell of a cellular access network to which the terminal was previously attached before registering or re-registering on the IP multimedia core network using the local access network and this access point.

As explained previously, the geographical location of the access points of the local access networks used to access the core network 2 is an important item of information that can be exploited in different ways.

We will now describe an example of use of this item of information by considering a SIP REGISTER registration message (or a SIP INVITE communication set-up message) sent, via the local access network L-NW and the access point 7, by the terminal 6-3 which does not possess any GPS location module or enabled location function. This SIP REGISTER message, when it is received by the server 4 thus does not contain any item of location information of the terminal 6-3 ("no" answer to the test step E20 and "yes" answer to the test step E100).

The server 4 then extracts, via its extraction module 4A, the hardware identifier ID(7) of the access point 7 used by the terminal 6-1. Then it polls the database DB1 using this hardware identifier ID(7) to determine the geographical location LOC(7) of the access point 7 (step E110).

The server 4 then inserts into the signaling of the message received from the terminal 6-1, the geographical location LOC(7) of the access point 7 as geographical location of the terminal 6-1, and transfers the message thus modified to the concerned items of equipment of the IP multimedia core network 2 for processing (step E120). These items of equipment thus possess an item of geographical location of the terminal 6-1 provided by the network and can use it as needed to provide services based on this location.

According to another example of use of the item of location information, this item of information is provided by the network whether or not the message received by the server 4 contains an item of location information provided by the terminal 6-3 (i.e., in this example of use, the test E100 is not implemented). To distinguish between any location provided by the terminal and that provided by the network, it will be possible to distinguish the latter by means, for example, of an exploitation of the '<gp:method>' field at 'networkHeuristic' in the item of presence information "application/pidf" (mentioned above) used to transmit the items of location information.

Of course, these examples are only given for illustrative purposes, and other applications of the invention may be envisioned. Thus for example, any item of equipment 5 of the core network 2 or any applicable (via an appropriate programming interface or API for Application Programmation Interface, for example a REST (Representational State Transfer)) API, whether it is provided by the operator of the core network 2 or by another operator, is in a position, by polling the databases DB1, DB2 and/or DB3, to:

identify the location of a user of a terminal on the basis of a communication identifier allocated to said user; and/or identify communication identifiers allocated to users located in a determined geographical area; and/or identify the location of an access point of a local access network used to access the IP multimedia core network on the basis of a hardware identifier of this access point; and/or identify an access point of a local access network located in the vicinity of a determined geographical area;

and can offer various services appropriate to the data gathered during these pollings. Such services are already offered today on the basis of items of location information available in cellular networks and can be extended, owing to the invention, to local access networks such as WiFi networks.

APPENDIX 1

Extract of the Signaling of a SIP REGISTER Message

REGISTER sip:ims.mnc001.mcc208.3gppnetwork.org SIP/2.0
Via: SIP/2.0/UDP 10.3.0.1:6100;branch=z9hG4bK-524287-1-4a581ac5b8117c17;rport;keep;transport=UDP
Max-Forwards: 70
Proxy-Require: sec-agree
Require: sec-agree
Contact: <sip:208014449145210@10.3.0.1:6100>;+sip.instance="<urn:gsma:imei:35508908-102734-0>";q=1.0;+g.3gpp.icsi-ref="urn%3Aurn-7%3A3gpp-service-.ims.icsi.mmtel"
To: <sip:208014449145210@ims.mnc001.mcc208.3gppnetwork.org>
From: <sip:208014449145210@ims.mnc001.mcc208.3gppnetwork.org>;tag=cf73504d
Call-ID: DwFkOcyAz2uXqUFQn3mkmQ..@10.3.0.1
CSeq: 2 REGISTER
Expires: 600000
Allow: INVITE, ACK, OPTIONS, CANCEL, BYE, UPDATE, INFO, REFER, NOTIFY, MESSAGE, PRACK
Content-Type: application/pidf+xml
Supported: path, sec-agree
User-Agent: My favorite mobile
Authorization: Digest
username="208014449145210@ims.mnc001.mcc208.3gppnetwork.org",realm="ims.mnc01.mcc208.3gppnetwork.org",uri="sip:ims.mnc001.mcc208.3gppnetwork.org",nonce="YIJBdnIMVWs5YUJZQVhWTQn+vbYHNgAA7uahzS2X4t0=",
response="2b042e38cccc964e170 544ba30749af9", algorithm=AKAv1-MD5,nc=00000001,qop=auth,
cnonce="90c1ae23b290e6f68d99f8e00104057c"
Security-Client: ipsec-3gpp;prot=esp;mod=trans;spi-c=48021;spi-s=48022;port-c=6101;port-s=6100;alg=hmac-md5-96;ealg=null, ipsec-3gpp;prot=esp;mod=trans;spi-c=48021;spi-s=48022;port-c=6101;port-s=6100;alg=hmac-sha-1-96;ealg=null
Security-Verify: ipsec-3gpp;q=0.1;alg=hmac-sha-1-96;spi-c=1489052182;spi-s=1489052183;port-c=32921;port-s=5067, ipsec-3gpp;q=0.2;a1g=hmac-md5-96;spi-c=1489052184;spi-s=1489052185;port-c=32921;port-s=5067
Geolocation-Routing: yes
Geolocation: <cid:sip:208014449145210@ims.mnc001.mcc208.3gppnetwork.org>
P-Access-Network-Info: IEEE-802.11;i-wlan-node-id=d84710fed998
Content-Length: 1451
Extract of the encapsulated item of information "application/pidf" contained in the SIP REGISTER message
<?xml version="1.0" encoding="UTF-8"?>
<presence entity="sip:208014449145210@ims.mnc001.mcc208.3gppnetwork.org"
xmlns="urn:ietf:params:xml:ns:pidf" xmlns:c="urn:ietf:params:xml:ns:pidf:cipid"
xmlns:caps="urn:ietf:params:xml:ns:pidf:caps"
xmlns:cl="urn:ietf:params:xml:ns:pidf:geopriv10:civicLoc"
xmlns:con="urn:ietf:params:xml:ns:geopriv:conf"
xmlns:gml="urn:opengis:specification:gml:schema-xsd:feature:v3.0"
xmlns:gp="urn:ietf:params:xml:ns:pidf:geopriv10"
xmlns:op="urn:oma:xml:prs:pidf:oma-pres"
xmlns:pdm="urn:ietf:params:xml:ns:pidf:data-model"
xmlns:rpid="urn:ietf:params:xml:ns:pidf:rpid">
  <tuple>
    <status>
      <gp:geopriv>
        <gp:location-info>
          <gs:Circle srsName="urn:ogc:def:crs:EPSG::4326" xmlns:gs="http://www.opengis.net/pidflo/1.0">
            <gml:pos>48.7601868-3.4744915</gml:pos>
            <gs:radius uom="urn:ogc:def:uom:EPSG::9001?">18.118</gs:radius>
          </gs:Circle>
          <con:confidence pdf="normal">68</con:confidence>
          <cl:civicAddress>
            <cl:country>FR</cl:country>
            <cl:A3>Lannion</cl:A3>
            <cl:A6>Rue Blaise Pascal</cl:A6>
            <cl: PC>22300</cl: PC>
          </cl:civicAddress>
        </gp:location-info>
        <gp:usage-rules>
          <gp:retransmission-allowed>no</gp:retransmission-allowed>
          <gp:retention-expiry>2017-03-10T10:35:57.00Z</gp:retention-expiry>
        </gp: usage-rules>
        <gp:method>DHCP</gp:method>
      </gp:geopriv>
    </status>
    <timestamp>2017-03-09T10:36:22Z</timestamp>
  </tuple>
</presence>

The invention claimed is:

1. A method of determining a geographical location of an access point of a wireless local access network used to access an IP multimedia core network, the method implemented by a server situated at the entrance of the IP multimedia core network, the method comprising,
  a) following the receipt of at least one message sent from at least one terminal via the access point, the signaling of the at least one message containing an item of terminal location information, the item of terminal location information inserted by the at least one terminal into the signaling of the message:

i) extracting from the signaling of the at least one message a hardware identifier of the access point; and
ii) storing, in association with the hardware identifier of the access point, the item of terminal location information inserted into the signaling of the at least one message by the at least one terminal;
b) identifying a plurality of items of terminal location information which have been stored, within a predetermined time interval, by the server situated at the entrance of the IP media core network in association with the hardware identifier of the access point; and
c) determining a geographical location of the access point on the basis of the identified plurality of items of terminal location information stored in association with the hardware identifier of the access point within the predetermined time interval, wherein in determining said geographical location of the access point, only the identified plurality of items of terminal location information that have been stored within the predetermined time interval are taken into account.

2. The method of claim 1 wherein the geographical location of the access point is determined:
by computing a barycenter of the plurality of items of terminal location information; or
on the basis of the item of terminal location information, stored in association with the hardware identifier of the access point, the most frequent.

3. The method of claim 1 wherein the identified plurality of items of terminal location information includes a number of items of terminal location information, stored in association with the hardware identifier of the access point, above a determined threshold.

4. The method of claim 1 wherein the identified plurality of items of terminal location information item of terminal location information inserted by the at least one terminal into the message comprises GPS (Global Positioning System) coordinates or a civic address of the at least one terminal.

5. The method of claim 1 wherein the identified plurality of items of terminal location information includes an item of terminal location information of a cell of a cellular access network to which a terminal is attached during a re-registration of the terminal on the IP multimedia core network, the re-registration following a previous registration of the terminal on the IP core network using the local access network and the access point.

6. The method of claim 1 wherein the identified plurality of items of terminal location information includes an item of terminal location information of a cell of a cellular access network to which a terminal had previously been attached before registering or re-registering with the IP multimedia core network using the local access network and the access point.

7. A method of managing at least one database of an IP multimedia core network by a server situated at the entrance of the IP multimedia core network, the management method comprising, for at least one access point of at least one local access network used to access the IP multimedia core network:
determining a geographical location of the access point using the determination method of claim 1; and
storing in a first database of the IP multimedia core network the geographical location of the access point in association with a hardware identifier of the access point.

8. The method of claim 7 further comprising, upon receipt of at least one message coming from a terminal via an access point of a local access network or via a cell of a cellular network to which the terminal is attached:
extracting from the signaling of the message a hardware identifier of the access point or an identifier of the cell, and at least one item of information from among:
a communication identifier allocated to a user of the terminal;
a communication identifier of the terminal used on the IP multimedia core network; and
an address where the terminal can be reached; and
storing in a second database of the IP multimedia core network the at least one item of information in association with the hardware identifier of the access point or with the identifier of the cell.

9. The method of claim 8 further comprising, when the terminal is attached to a cell of a cellular network, storing in a third database of the IP multimedia core network a geographical location of the cell in association with the identifier of the cell.

10. The method of claim 7 further comprising, upon receipt by the server of a message coming from a terminal via an access point of a local access network used to access the IP multimedia core network:
extracting, from the message, a hardware identifier of the access point;
determining, by polling the first database, a geographical location of the access point associated with the hardware identifier extracted from the message; and
inserting into the signaling of the message, as a geographical location of the terminal, the determined geographical location of the access point, before transmitting the message to another item of equipment of the IP multimedia core network.

11. A computer comprising a processor and a memory, the memory having stored thereon instructions which, when executed by the processor, cause the processor to implement the method of claim 1.

12. A non-transitory, computer readable storage medium having stored thereon instructions which, when executed by a processor, cause the processor to implement the method of claim 1.

13. The method of claim 1, wherein the geographical location of the access point is determined on the basis of the most recent item of terminal location information stored in association with the hardware identifier of the access point.

14. The method of claim 1, wherein the server stores, in association with the extracted hardware identifier of the access point, the item of terminal location information inserted into the signaling of the at least one message by the at least one terminal along with at least a second item of terminal location information inserted into the signaling of a second message sent by a second terminal via the access point and stored within the predetermined time interval, and wherein each of the item of terminal location information and second item of terminal location information are taken into account in determining a geographical location of the access point.

15. A server situated at the entrance of an IP multimedia core network, the server comprising a processor, the server configured to, for at least one access point of at least one local access network used to access the IP multimedia core network:
following the receipt of at least one message via the access point, the message coming from at least one terminal connected to the access point, the signaling of the at least one message containing an item of terminal location information, the item of terminal location information inserted by the at least one terminal into the signaling of the at least one message:
 i) extract from the signaling of the at least one message a hardware identifier of the access point; and
 ii) store in association with the extracted hardware identifier of the access point, the item of terminal location information inserted by the at least one terminal into the signaling of the at least one message;
identify a plurality of items of terminal location information which have been stored, within a predetermined time interval, by the server situated at the entrance of the IP media core network in association with the hardware identifier of the access point;
determine a geographical location of the access point on the basis of the identified plurality of items of terminal location information stored in association with the hardware identifier of the access point within the predetermined time interval, said server being configured to only take into account the identified plurality of items of terminal location information that have been stored within the predetermined time interval for determining said geographical location of the access point.

16. An IP multimedia core network comprising a first database and the server of claim 15, the server configured to store in the first database for the at least one access point, the hardware identifier of the at least one access point in association with the geographical location of the access point determined by the server.

17. The IP multimedia core network of claim 16, further comprising a second database, the second database storing the at least one item of information in association with the hardware identifier of the access point or the identifier of the cell.

18. The IP multimedia core network of claim 16 further comprising a third database containing, for at least one cell of a cellular access network used to access the IP multimedia core network, an identifier of the cell in association with a geographical location of the cell.

19. A system comprising:
the IP multimedia core network of claim 18; and
a software application able to provide a service, the software application being configured, during the provision of the service, to:
 identify the location of a user of a terminal on the basis of a communication identifier allocated to the user; and/or
 identify communication identifiers allocated to users located in a determined geographical area; and/or
 identify the location of an access point of a local access network used to access the IP multimedia core network on the basis of a hardware identifier of the access point; and/or
 identify an access point of a local access network located in the vicinity of a determined geographical area;
by polling the first and/or the second and/or the third database of the IP multimedia core network.

20. A method of determining a geographical location of an access point of a wireless local access network used to access an IP multimedia core network, the method implemented by a server situated at the entrance of the IP multimedia core network, the method comprising:
a) receiving a message sent from at least one terminal via the access point, the signaling of the at least one message containing an item of terminal location information inserted by the at least one terminal and indicative of a location of the at least one terminal when the at least one message was sent by the at least one terminal via the access point:
 i) extracting from the signaling a hardware identifier of the access point; and
 ii) storing, in association with the hardware identifier of the access point, the item of terminal location information inserted into the signaling by the at least one terminal;
b) identifying a plurality of items of terminal location information which have been stored, within a predetermined time interval, by the server situated at the entrance of the IP media core network in association with the hardware identifier of the access point; and
c) determining a geographical access point location of the access point on the basis of the identified plurality of items of terminal location information stored in association with the hardware identifier of the access point within the predetermined time interval, wherein in determining said geographical access point location, only the identified plurality of items of terminal location information that have been stored in association with the hardware identifier within the predetermined time interval are taken into account.

\* \* \* \* \*